(12) United States Patent
Nakashima et al.

(10) Patent No.: US 11,719,335 B2
(45) Date of Patent: Aug. 8, 2023

(54) WORK MACHINE AND CONTROL METHOD

(71) Applicant: KOMATSU LTD., Tokyo (JP)

(72) Inventors: Akira Nakashima, Tokyo (JP); Shinobu Kamikawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 64 days.

(21) Appl. No.: 17/432,350

(22) PCT Filed: Apr. 2, 2020

(86) PCT No.: PCT/JP2020/015188
§ 371 (c)(1),
(2) Date: Aug. 19, 2021

(87) PCT Pub. No.: WO2020/209172
PCT Pub. Date: Oct. 15, 2020

(65) Prior Publication Data
US 2022/0154738 A1    May 19, 2022

(30) Foreign Application Priority Data

Apr. 11, 2019 (JP) ................................. 2019-075310

(51) Int. Cl.
*F16H 61/4078* (2010.01)
*F15B 21/00* (2006.01)
(Continued)

(52) U.S. Cl.
CPC ........... *F16H 61/4078* (2013.01); *E02F 9/22* (2013.01); *F15B 11/08* (2013.01); *F15B 11/167* (2013.01);
(Continued)

(58) Field of Classification Search
CPC ............ F16H 61/4078; F16H 61/4008; F16H 61/4139; E02F 9/22; F15B 11/08; F15B 11/167; F15B 21/005; F15B 21/0423; F15B 2211/20546; F15B 2211/20576; F15B 2211/329; F15B 2211/355; F15B 2211/36;
(Continued)

(56) References Cited

U.S. PATENT DOCUMENTS 5,390,759 A * 2/1995 Gollner ................. F16H 61/468
180/308
6,108,948 A * 8/2000 Tozawa ................... E02F 3/435
37/348

(Continued)

FOREIGN PATENT DOCUMENTS

CN   103382951 A   11/2013
CN   105593535 A    5/2016
(Continued)

*Primary Examiner* — Dustin T Nguyen
(74) *Attorney, Agent, or Firm* — Faegre Drinker Biddle & Reath LLP

(57) ABSTRACT

An HST circuit has a hydraulic pump that converts a drive force of an engine into energy of oil, and a hydraulic motor that converts the energy of the oil converted by the hydraulic pump into drive energy. Pressure sensors detect a pressure of the oil within the HST circuit. A variable charge pump replenishes the oil into the HST circuit. A controller controls a capacity of the variable charge pump based on the pressure of the oil within the HST circuit detected by the pressure sensors.

17 Claims, 5 Drawing Sheets

(51) Int. Cl.
*F15B 11/08* (2006.01)
*F15B 13/042* (2006.01)
*F16H 61/4139* (2010.01)
*F16H 61/4008* (2010.01)
*F15B 21/0423* (2019.01)
*E02F 9/22* (2006.01)
*F15B 11/16* (2006.01)

(52) U.S. Cl.
CPC .......... *F15B 13/042* (2013.01); *F15B 21/005* (2013.01); *F15B 21/0423* (2019.01); *F16H 61/4008* (2013.01); *F16H 61/4139* (2013.01); *F15B 2211/20546* (2013.01); *F15B 2211/20576* (2013.01); *F15B 2211/329* (2013.01); *F15B 2211/355* (2013.01); *F15B 2211/36* (2013.01); *F15B 2211/613* (2013.01); *F15B 2211/615* (2013.01); *F15B 2211/62* (2013.01); *F15B 2211/633* (2013.01); *F15B 2211/6303* (2013.01); *F15B 2211/6313* (2013.01); *F15B 2211/6346* (2013.01); *F15B 2211/67* (2013.01); *F15B 2211/7058* (2013.01)

(58) Field of Classification Search
CPC .......... F15B 2211/613; F15B 2211/615; F15B 2211/62; F15B 2211/6303; F15B 2211/6313; F15B 2211/633; F15B 2211/6346; F15B 2211/67; F15B 2211/7058

See application file for complete search history.

(56) References Cited

U.S. PATENT DOCUMENTS

| | | | | |
|---|---|---|---|---|
| 7,469,534 | B2* | 12/2008 | Nishi | F16H 61/462 |
| | | | | 60/428 |
| 8,190,342 | B2* | 5/2012 | Shinohara | E02F 9/2296 |
| | | | | 74/732.1 |
| 8,607,919 | B2* | 12/2013 | Shirao | F04B 49/002 |
| | | | | 180/367 |
| 10,100,494 | B2* | 10/2018 | Vonderwell | E02F 9/123 |
| 10,329,739 | B2* | 6/2019 | Hoshino | E02F 9/2285 |
| 10,808,839 | B2* | 10/2020 | Zhang | B60W 50/10 |
| 2008/0238187 | A1* | 10/2008 | Garnett | F16H 61/4096 |
| | | | | 180/199 |
| 2017/0096798 | A1 | 4/2017 | Takami | |
| 2017/0198731 | A1 | 7/2017 | Sugano | |

FOREIGN PATENT DOCUMENTS

| | | |
|---|---|---|
| CN | 106662130 A | 5/2017 |
| JP | H11-280637 A | 10/1999 |
| JP | 2000-104290 A | 4/2000 |
| JP | 2006-336673 A | 12/2006 |
| JP | 2016-35321 A | 3/2016 |

* cited by examiner

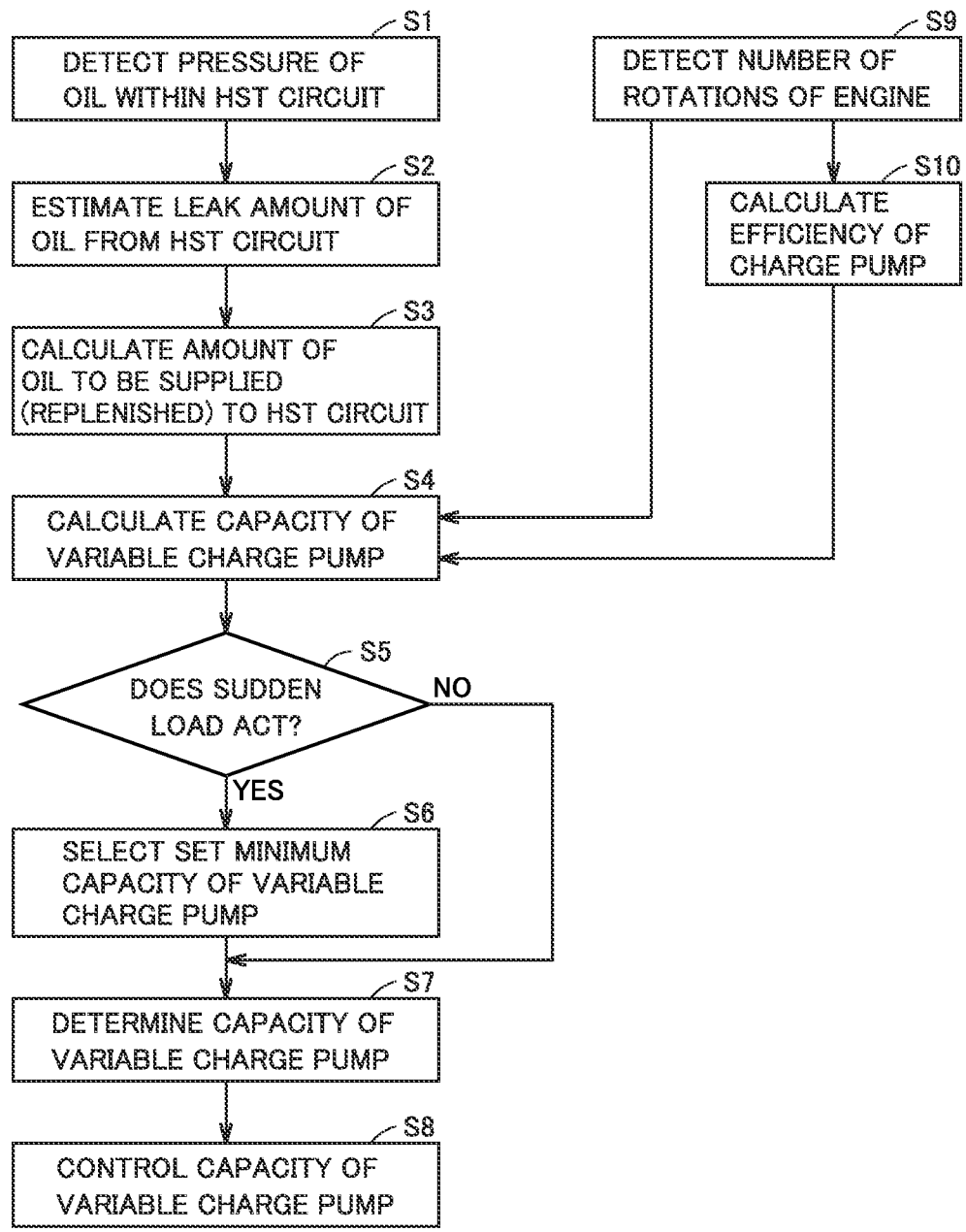

WORK MACHINE AND CONTROL METHOD

TECHNICAL FIELD

The present disclosure relates to a work machine and a control method.

BACKGROUND ART

Conventionally, a hydraulic static transmission (HST) has been known as one type of transmission. The HST is a transmission of the type that converts a pressure oil produced by driving a hydraulic pump using an engine, again into a rotation force using a hydraulic motor. The HST has a closed circuit (an HST circuit) having the hydraulic pump and the hydraulic motor described above.

U.S. Patent Application Publication No. 2008/0238187 (PTL 1) discloses a charge pump for pressurizing a hydraulic system including a hydrostatic drive unit. This charge pump is set to operate in two steps at a first predetermined pressure in a no-load situation and a second predetermined pressure in a maximum load situation.

CITATION LIST

Patent Literature

PTL 1: U.S. Patent Application Publication No. 2008/0238187

SUMMARY OF INVENTION

Technical Problem

In the charge pump described in PTL 1, it is not possible to replenish a fluid appropriately according to a leak amount from the HST circuit. Thus, loss of horsepower occurs and reduction of fuel economy is insufficient.

An object of the present disclosure is to provide a work machine and a control method capable of improving fuel economy.

Solution to Problem

A work machine includes a motive power source, a closed circuit, a pressure sensor, a variable charge pump, and a controller. The closed circuit has a pump that converts a drive force of the motive power source into energy of a fluid, and a motor that converts the energy of the fluid converted by the pump into drive energy. The pressure sensor detects a pressure of the fluid within the closed circuit. The variable charge pump replenishes the fluid into the closed circuit. The controller controls a capacity of the variable charge pump based on the pressure of the fluid within the closed circuit detected by the pressure sensor.

Advantageous Effects of Invention

According to the present disclosure, a work machine and a control method capable of improving fuel economy can be achieved.

BRIEF DESCRIPTION OF DRAWINGS

FIG. 5 is a flowchart showing a control method for the work machine of FIG. 1.

DESCRIPTION OF EMBODIMENTS

Figure 1:
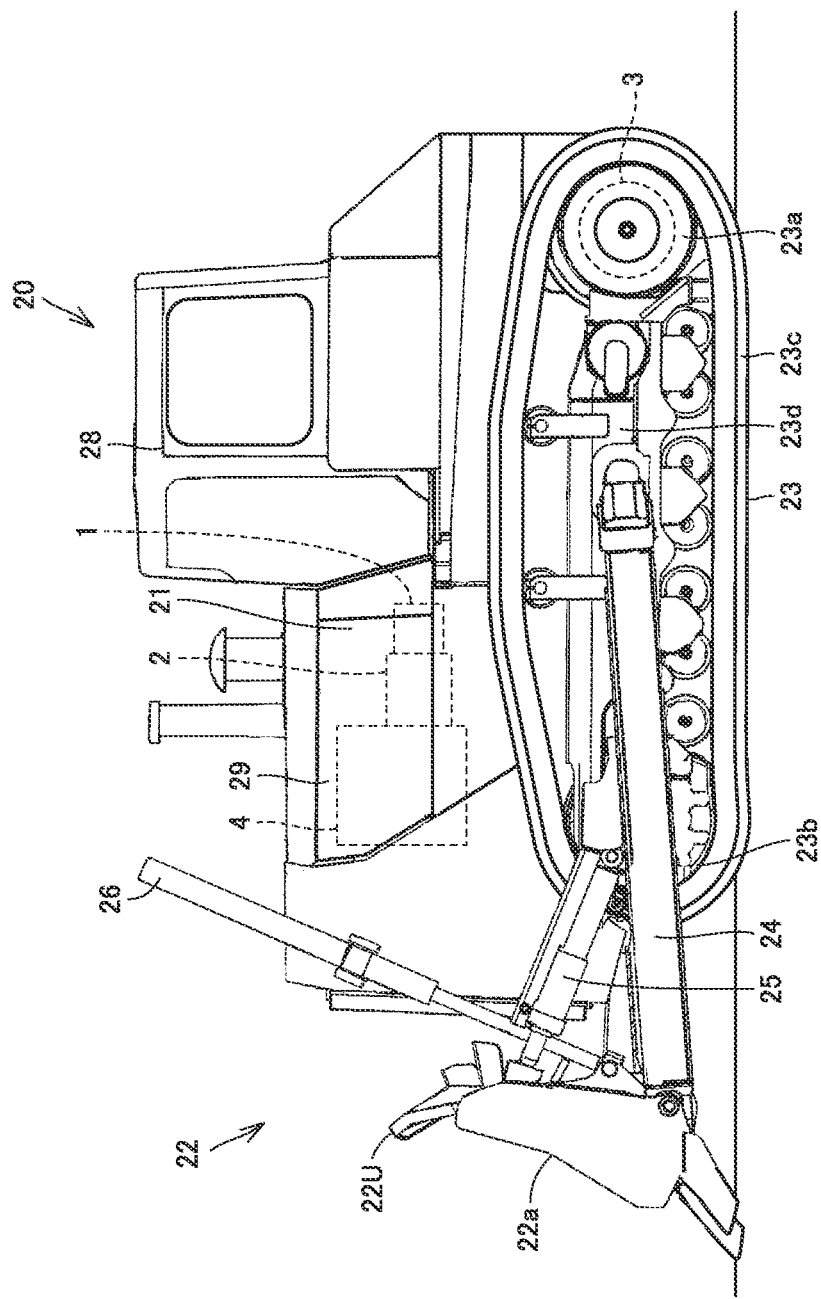
FIG. 1 is a side view showing a configuration of a bulldozer as an example of a work machine in one embodiment.

Hereinafter, an embodiment of the present disclosure will be described in detail with reference to the drawings.

It should be noted that, in the specification and the drawings, identical or corresponding components will be designated by the same reference characters, and redundant description will not be repeated. Further, in the drawings, some configurations may be omitted or simplified for convenience of description.

<Configuration of Work Machine>

First, a configuration of a bulldozer as an example of a work machine in one embodiment of the present disclosure will be described with reference to FIG. 1. It should be noted that the present disclosure is not limited to a bulldozer, and is applicable to any work machine having an HST circuit, such as a hydraulic excavator, a wheel loader, or a motor grader.

FIG. 1 is a schematic side view showing a configuration of a bulldozer as an example of a work machine in one embodiment. As shown in FIG. 1, a bulldozer as a work machine 20 in the present embodiment mainly has a crawler travel unit 23, a vehicular body 21, and a work implement 22. Vehicular body 21 and work implement 22 constitute a work machine body.

Vehicular body 21 has a cab (an operator's cab) 28 and an engine compartment 29. Cab 28 is disposed in an upper rear portion of vehicular body 21, and engine compartment 29 is disposed in front of cab 28. An engine 4 (motive power source) is disposed within engine compartment 29.

Work implement 22 mainly has a blade 22a (work tool), a frame 24, a tilt cylinder 25, and a lift cylinder 26. Blade 22a is disposed in front of vehicular body 21. Blade 22a is supported on the right and left sides by frame 24. One end of frame 24 is attached to a rear surface of blade 22a by a rotatable support portion. The other end of frame 24 is rotatably supported on a side surface of vehicular body 21.

Blade 22a is driven by tilt cylinder 25 and lift cylinder 26. One end of tilt cylinder 25 is rotatably supported on the rear surface of blade 22a. The other end of tilt cylinder 25 is rotatably supported on frame 24. Due to expansion and contraction of tilt cylinder 25 by hydraulic pressure, blade 22a pivots about the support portion by frame 24.

One end of lift cylinder 26 is rotatably supported on an upper surface of frame 24. An intermediate portion of lift cylinder 26 is rotatably supported on the side surface of vehicular body 21. Due to expansion and contraction of lift cylinder 26 by hydraulic pressure, blade 22a moves about the other end of frame 24 in an up-down direction.

Crawler travel unit 23 has a pair of right and left crawler belt units. The pair of right and left crawler belt units each mainly have a drive wheel (sprocket) 23a, an idler wheel (idler) 23b, a crawler belt 23c, and a track frame 23d.

Each of drive wheel 23a and track frame 23d is attached to a side portion of vehicular body 21. Drive wheel 23a is disposed behind track frame 23d such that it can be driven to rotate. Idler wheel 23b is attached to track frame 23d.

Idler wheel 23b is rotatably disposed, for example, at a front end portion of track frame 23d.

Crawler belt 23c is configured in an annular shape (an endless manner) and is looped over drive wheel 23a and idler wheel 23b. Crawler belt 23c is engaged with drive wheel 23a and is configured to be rotatable as drive wheel 23a is driven to rotate. By the rotation of crawler belt 23c, idler wheel 23b engages with crawler belt 23c, and thus can be driven to rotate.

The work machine body constituted by vehicular body 21 and work implement 22 is supported by crawler travel unit 23 such that it can travel.

A hydraulic motor 3 included in an HST circuit is connected to drive wheel 23a. A hydraulic pump 2 included in the HST circuit is disposed within engine compartment 29. A variable charge pump 1 that replenishes a fluid (for example, oil) into the HST circuit is disposed within engine compartment 29.

<Configuration of Hydraulic Drive Unit>

Next, a configuration of a hydraulic drive unit included in work machine 20 in the present embodiment will be described with reference to FIG. 2.

Figure 2:
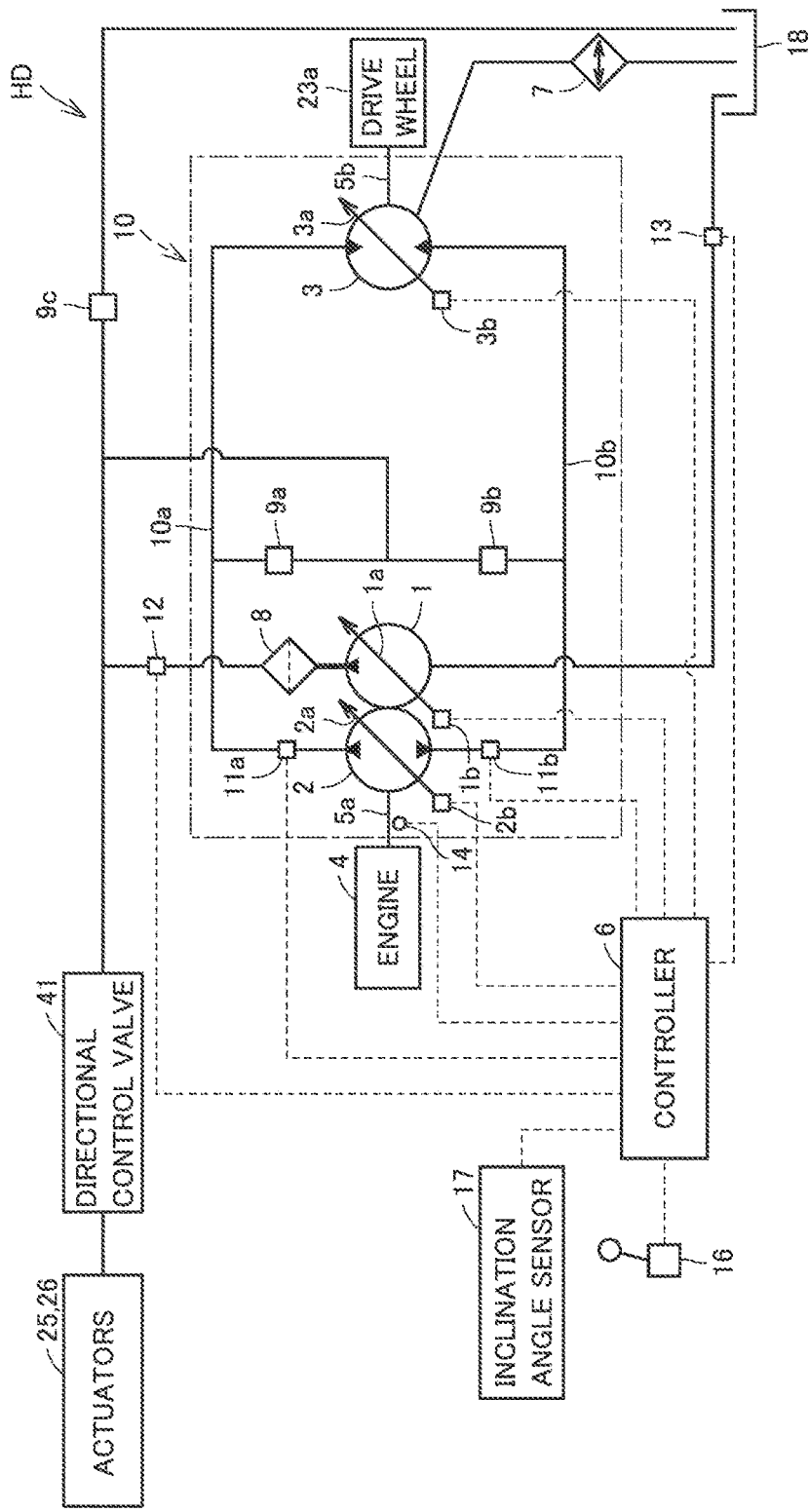
FIG. 2 is a view showing a configuration of a hydraulic drive unit included in the work machine of FIG. 1.

FIG. 2 is a view showing a configuration of a hydraulic drive unit included in the work machine of FIG. 1. As shown in FIG. 2, a hydraulic drive unit HD changes the speed of a drive force from engine 4 and transfers the drive force to drive wheel 23a. Hydraulic drive unit HD mainly has variable charge pump 1, hydraulic pump 2, and hydraulic motor 3.

Hydraulic drive unit HD has an HST circuit 10. HST circuit 10 is a closed hydraulic circuit (closed circuit) having hydraulic pump 2 and hydraulic motor 3. Specifically, HST circuit 10 is constituted by hydraulic pump 2, hydraulic motor 3, a first oil path (first flow path) 10a, and a second oil path (second flow path) 10b.

First oil path 10a connects hydraulic pump 2 and hydraulic motor 3. First oil path 10a can supply oil discharged from hydraulic pump 2 to hydraulic motor 3. Second oil path 10b is a flow path different from first oil path 10a, and connects hydraulic pump 2 and hydraulic motor 3. Second oil path 10b can supply the oil discharged from hydraulic pump 2 to hydraulic motor 3.

Hydraulic pump 2 is a swash plate axial pump, for example, and has a variable swash plate 2a. A drive shaft of hydraulic pump 2 is connected to an output shaft 5a of engine 4. The angle of variable swash plate 2a is continuously controlled steplessly by an actuator 2b. Actuator 2b is a solenoid, for example.

The drive shaft of hydraulic pump 2 is rotated by driving engine 4. Thereby, hydraulic pump 2 pressurizes the oil within HST circuit 10 and discharges the oil to one of first oil path 10a and second oil path 10b. Thus, hydraulic pump 2 converts the drive force of engine 4 into energy of the oil (fluid). This energy of the oil is transferred to hydraulic motor 3 through first oil path 10a or second oil path 10b.

Hydraulic motor 3 is a swash plate axial motor, for example, and has a variable swash plate 3a. A drive shaft of hydraulic motor 3 is connected to an input shaft 5b of drive wheel 23a. The angle of variable swash plate 3a is continuously controlled steplessly by an actuator 3b. Actuator 3b is a solenoid, for example.

The drive shaft of hydraulic motor 3 is rotated by the energy of the oil converted by hydraulic pump 2 described above being transferred to hydraulic motor 3. Input shaft 5b of drive wheel 23a is rotated by the rotation of the drive shaft of hydraulic motor 3. Thus, hydraulic motor 3 converts the energy of the oil into rotation energy (drive energy) of input shaft 5b. Drive wheel 23a is rotated by the rotation of input shaft 5b.

In HST circuit 10, variable speed can be achieved by arbitrarily changing the angles of variable swash plate 2a of hydraulic pump 2 and variable swash plate 3a of hydraulic motor 3.

In hydraulic drive unit HD, due to the operation of HST circuit 10, heat generation, dirt, or the like may occur in the oil within HST circuit 10. Accordingly, it is necessary to cool, clean, or otherwise treat the oil within HST circuit 10.

Specifically, the oil within HST circuit 10 is taken out of HST circuit 10 from hydraulic motor 3, for example. The oil taken out of HST circuit 10 is cooled by an oil cooler 7, and then flows into a tank 18. The oil within tank 18 is pumped up by variable charge pump 1, and is replenished into HST circuit 10. The oil is cleaned by a filter 8 when it is replenished from variable charge pump 1 into HST circuit 10. In this manner, the oil within HST circuit 10 is cooled, cleaned, or otherwise treated.

Variable charge pump 1 is a swash plate axial pump, for example, and has a variable swash plate 1a. A drive shaft of variable charge pump 1 is connected to output shaft 5a of engine 4. The angle of variable swash plate 1a is continuously controlled steplessly by an actuator 1b. Actuator 1b is a solenoid, for example. In variable charge pump 1, a capacity of variable charge pump 1 can be increased or decreased by changing the angle of variable swash plate 1a.

The drive shaft of variable charge pump 1 is rotated by driving engine 4. Thereby, variable charge pump 1 pumps up the oil from tank 18 and supplies the oil to HST circuit 10. Specifically, variable charge pump 1 replenishes the oil pumped up from tank 18 to each of first oil path 10a and second oil path 10b.

In HST circuit 10, a valve 9a is disposed on a flow path that replenishes the oil from variable charge pump 1 to first oil path 10a. Further, a valve 9b is disposed on a flow path that replenishes the oil from variable charge pump 1 to second oil path 10b. Each of valves 9a and 9b may be a check valve for setting HST circuit 10 as a closed circuit, or may be a relief valve that restricts a pressure increase in HST circuit 10, or may be both of the check valve and the relief valve described above.

HST circuit 10 is provided with pressure sensors 11a and 11b that detect a pressure of the oil within HST circuit 10. Pressure sensors 11a and 11b have a first pressure sensor 11a and a second pressure sensor 11b. First pressure sensor 11a is disposed on first oil path 10a. First pressure sensor 11a detects a pressure of the oil in first oil path 10a. Second pressure sensor 11b is disposed on second oil path 10b. Second pressure sensor 11b detects a pressure of the oil in second oil path 10b.

Each of first pressure sensor 11a and second pressure sensor 11b is electrically connected to a controller 6. Thereby, a detection signal of the hydraulic pressure in first flow path 10a detected by first pressure sensor 11a is inputted to controller 6. Further, a detection signal of the hydraulic pressure in second flow path 10b detected by second pressure sensor 11b is inputted to controller 6.

HST circuit 10 is provided with a rotation sensor 14 that detects the number of rotations of engine 4. Rotation sensor 14 may be rotation sensor 14 that detects the number of rotations of output shaft 5a, or may be a rotation sensor that detects the number of rotations of the drive shaft of variable charge pump 1. Further, rotation sensor 14 may be a rotation sensor that detects the number of rotations of the drive shaft of hydraulic pump 2.

Rotation sensor 14 is electrically connected to controller 6. Thereby, a detection signal of the number of rotations in output shaft 5a detected by rotation sensor 14 is inputted to controller 6.

Hydraulic drive unit HD is provided with a temperature sensor 13 that detects a temperature of the oil within HST circuit 10. Temperature sensor 13 is disposed, for example, on an oil path that connects tank 18 and variable charge pump 1.

Temperature sensor 13 is electrically connected to controller 6. Thereby, a detection signal of the temperature in the oil path detected by temperature sensor 13 is inputted to controller 6.

Further, variable charge pump 1 may be connected to provide a pilot pressure to drive circuits for actuators (tilt cylinder 25, lift cylinder 26). In this case, variable charge pump 1 is connected to a directional control valve 41 that controls driving of actuators 25 and 26.

Hydraulic drive unit HD is provided with a pilot pressure sensor 12 that detects the pilot pressure to be provided to directional control valve 41. Pilot pressure sensor 12 is disposed on an oil path that connects variable charge pump 1 and directional control valve 41. Pilot pressure sensor 12 is electrically connected to controller 6. Thereby, a detection signal of the pilot pressure detected by pilot pressure sensor 12 is inputted to controller 6.

Further, a relief valve 9c is disposed on a flow path of the oil discharged from variable charge pump 1. The pilot pressure to be provided from variable charge pump 1 to directional control valve 41 is adjusted by relief valve 9c so as not to become equal to or more than a set pressure.

Further, an inclination angle sensor 17 is attached to work machine 20 (FIG. 1). Inclination angle sensor 17 detects an inclination angle of work machine 20 relative to a horizontal plane. Inclination angle sensor 17 is electrically connected to controller 6. Thereby, a detection signal of the inclination angle in work machine 20 detected by inclination angle sensor 17 is inputted to controller 6.

Further, a travel lever 16 is disposed within cab 28 (FIG. 1) of work machine 20. Travel lever 16 accepts operation by an operator. Travel lever 16 is configured such that it can select one state of forward travel, backward travel, and neutral in traveling, for example.

Travel lever 16 is electrically connected to controller 6. Thereby, a detection signal indicating the one state of forward travel, backward travel, and neutral selected by travel lever 16 is inputted to controller 6.

<Functional Blocks of Controller 6>

Next, functional blocks of controller 6 shown in FIG. 2 will be described with reference to FIGS. 3 and 4.

Figure 3:
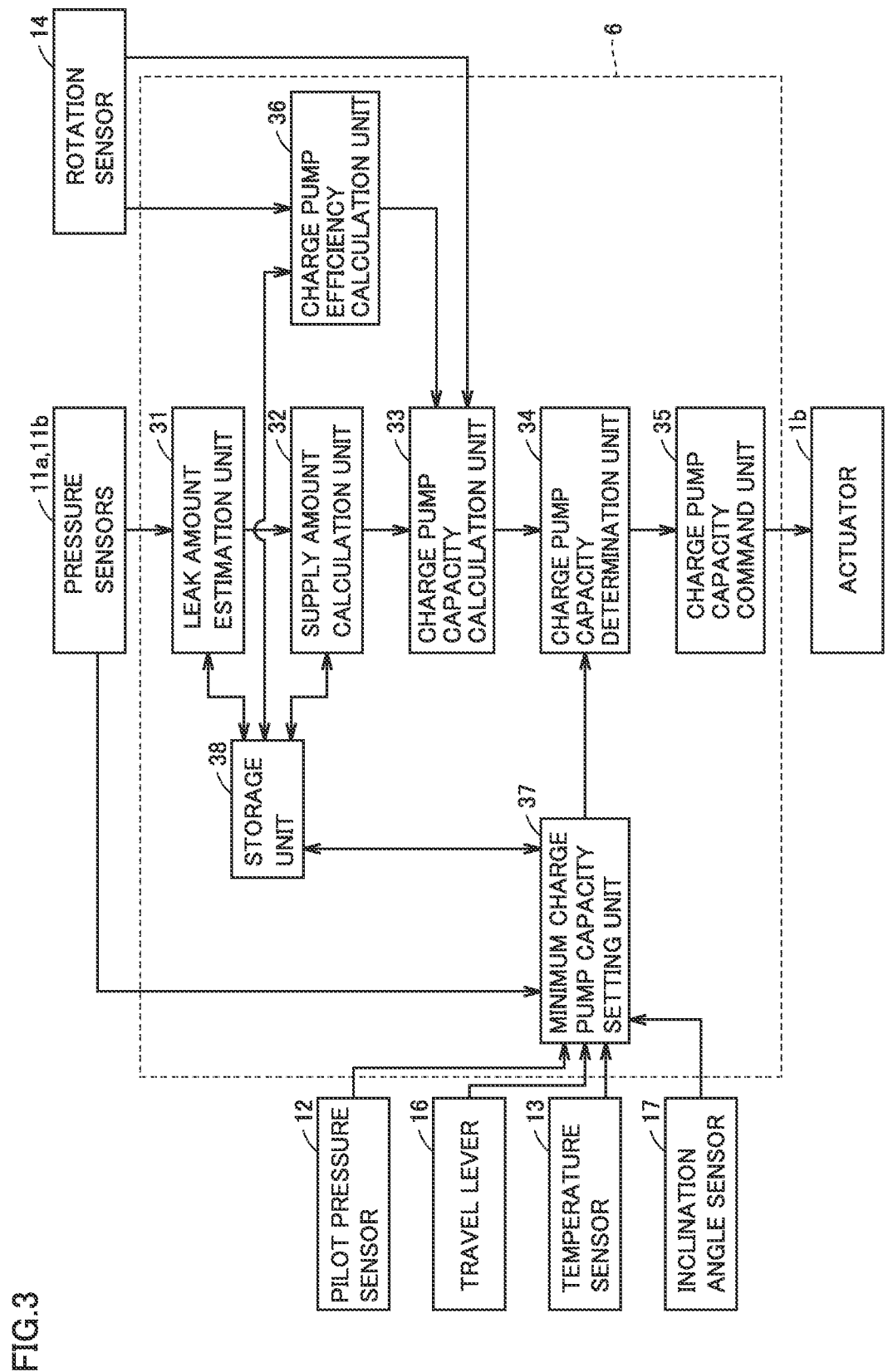
FIG. 3 is a view showing functional blocks of a controller shown in FIG. 2.

FIG. 3 is a view showing functional blocks of the controller shown in FIG. 2. FIG. 4 is a view showing a situation before the bulldozer as an example of the work machine runs into an excavation object on a downward slope.

As shown in FIG. 3, controller 6 has a leak amount estimation unit 31, a supply amount calculation unit 32, a charge pump capacity calculation unit 33, a charge pump capacity determination unit 34, a charge pump capacity command unit 35, a charge pump efficiency calculation unit 36, a minimum charge pump capacity setting unit 37, and a storage unit 38.

Leak amount estimation unit 31 estimates an amount of the oil taken out of HST circuit 10 (hereinafter referred to as a "leak amount") for cooling and/or cleaning of the oil within HST circuit 10. Upon receiving the pressure signals from pressure sensors 11a and 11b, leak amount estimation unit 31 refers to information within storage unit 38.

Storage unit 38 stores an HST pressure-leak amount table indicating the relation between the pressure of the oil within HST circuit 10 and the leak amount. Leak amount estimation unit 31 refers to the HST pressure-leak amount table in storage unit 38, and estimates the leak amount based on the pressure signals received from pressure sensors 11a and 11b. The leak amount estimated by leak amount estimation unit 31 is outputted to supply amount calculation unit 32.

Supply amount calculation unit 32 calculates an amount of the oil to be supplied (replenished) to HST circuit 10. Upon receiving information of the leak amount from leak amount estimation unit 31, supply amount calculation unit 32 refers to information within storage unit 38.

Storage unit 38 stores a safety factor that considers response delay of hydraulic pump 2 (FIG. 2). The safety factor is set for each state of forward travel, backward travel, and neutral to be selected by travel lever 16.

Supply amount calculation unit 32 calculates a supply amount by multiplying the information of the leak amount received from leak amount estimation unit 31 by the safety factor (supply amount=leak amount×safety factor). The supply amount calculated by supply amount calculation unit 32 is outputted to charge pump capacity calculation unit 33.

The number of rotations of engine 4 detected by rotation sensor 14 is outputted to charge pump capacity calculation unit 33. As described above, the number of rotations of engine 4 may be the number of rotations of output shaft 5a, or the number of rotations of the drive shaft of variable charge pump 1. Further, the number of rotations of engine 4 may be the number of rotations of the drive shaft of hydraulic pump 2.

Further, the number of rotations of engine 4 detected by rotation sensor 14 is outputted to charge pump efficiency calculation unit 36. Upon receiving information of the number of rotations of engine 4 from rotation sensor 14, charge pump efficiency calculation unit 36 refers to storage unit 38.

Storage unit 38 stores a number of rotations-volume efficiency table indicating the relation between the number of rotations of engine 4 and volume efficiency of variable charge pump 1. Charge pump efficiency calculation unit 36 refers to the number of rotations-volume efficiency table in storage unit 38, and calculates the volume efficiency of variable charge pump based on the information of the number of rotations of the engine received from rotation sensor 14. The volume efficiency of variable charge pump 1 calculated by charge pump efficiency calculation unit 36 is outputted to charge pump capacity calculation unit 33.

Charge pump capacity calculation unit 33 calculates a capacity of variable charge pump 1. Charge pump capacity calculation unit 33 calculates the capacity of variable charge pump 1 by dividing the supply amount received from supply amount calculation unit 32 by the number of rotations of engine 4 received from rotation sensor 14 (capacity of variable charge pump 1=supply amount÷number of rotations of engine).

When the capacity of variable charge pump 1 is calculated, the volume efficiency of variable charge pump 1 is considered. The volume efficiency of variable charge pump 1 is obtained by dividing a real discharge amount (actual discharge amount) of variable charge pump 1 by a theoretical discharge amount (volume efficiency %=real discharge amount÷theoretical discharge amount×100).

In order to obtain the capacity of variable charge pump 1 obtained by the above calculation as the real discharge volume of variable charge pump 1, variable charge pump 1 has to operate with a capacity equal to the theoretical discharge amount. The capacity of variable charge pump 1 equal to the theoretical discharge amount is obtained by dividing the capacity of variable charge pump 1 (=supply amount÷number of rotations of engine) calculated as described above by the volume efficiency (capacity equal to theoretical discharge amount=supply amount÷number of rotations of engine÷volume efficiency).

The capacity of variable charge pump 1 equal to the theoretical discharge amount calculated by charge pump capacity calculation unit 33 is outputted to charge pump capacity determination unit 34.

Charge pump capacity determination unit 34 determines a capacity of variable charge pump 1 to be outputted to variable charge pump 1. When determining the capacity of variable charge pump 1, charge pump capacity determination unit 34 considers information from minimum charge pump capacity setting unit 37. Minimum charge pump capacity setting unit 37 sets a minimum capacity of variable charge pump 1.

Minimum charge pump capacity setting unit 37 performs setting such that the minimum capacity of variable charge pump 1 increases in a situation where a sudden load acts on HST circuit 10, for example. In addition, minimum charge pump capacity setting unit 37 performs setting such that the capacity of variable charge pump 1 increases in a situation where the oil within HST circuit 10 is overheated. This can suppress delay in the increase of the capacity of variable charge pump 1 when a sudden load acts, and can also suppress the oil within HST circuit 10 from being overheated.

Figure 4:
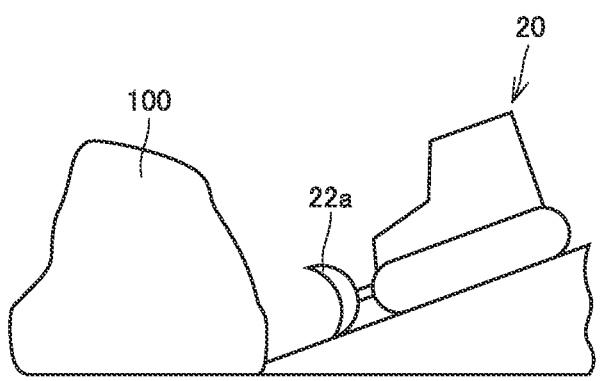
FIG. 4 is a view showing a situation before the bulldozer as an example of the work machine runs into an excavation object on a downward slope.

For example, in a state where work machine 20 is overrunning on a downward slope as shown in FIG. 4, the number of rotations of hydraulic pump 2 increases, and the number of rotations of engine 4 increases. When the number of rotations of engine 4 increases, the capacity of variable charge pump 1 is reduced to a small capacity.

When blade 22*a* of work machine 20 runs into an excavation object 100 from this state, a sudden load acts on HST circuit 10, and the hydraulic pressure within HST circuit 10 rapidly increases. When the hydraulic pressure within HST circuit 10 rapidly increases, the leak amount of the oil from HST circuit 10 also rapidly increases accordingly. Thus, replenishment of the oil into HST circuit 10 by variable charge pump 1 is delayed.

Accordingly, in the situation where a sudden load acts on HST circuit 10, minimum charge pump capacity setting unit 37 performs setting such that the minimum capacity of variable charge pump 1 increases, to prevent the replenishment of the oil into HST circuit 10 by variable charge pump 1 from being delayed.

In addition, in the situation where the oil within HST circuit 10 is overheated, minimum charge pump capacity setting unit 37 performs setting such that the capacity of variable charge pump 1 increases.

The pressure signals outputted from pressure sensors 11*a* and 11*b* are inputted into minimum charge pump capacity setting unit 37. A towing force of work machine 20 can be calculated based on the hydraulic pressure within HST circuit 10 detected by pressure sensors 11*a* and 11*b*. When the towing force is smaller than a first value, minimum charge pump capacity setting unit 37 performs setting such that the minimum capacity of variable charge pump 1 maintains a second value which is a predetermined value. This can suppress delay in the replenishment of the oil into HST circuit 10 by variable charge pump 1, even in a case where a sudden load occurs due to a decrease in the towing force of work machine 20.

The signal of the pilot pressure detected by pilot pressure sensor 12 is inputted to minimum charge pump capacity setting unit 37. When the pilot pressure is smaller than a third value, minimum charge pump capacity setting unit 37 performs setting such that the minimum capacity of variable charge pump 1 increases when compared with a case where the pilot pressure is more than or equal to the third value. For example, when the pilot pressure is smaller than the third value, minimum charge pump capacity setting unit 37 performs setting such that the capacity of variable charge pump 1 has a maximum value. This prevents the capacity of variable charge pump 1 from being reduced too much when a sudden load occurs in HST circuit 10, and can compensate for a minimum value of the pilot pressure.

The signal indicating one travel state of forward travel, backward travel, and neutral selected by travel lever 16 is inputted to minimum charge pump capacity setting unit 37. Minimum charge pump capacity setting unit 37 sets a minimum capacity of variable charge pump 1 for each case of forward travel, backward travel, and neutral. This prevents the capacity of variable charge pump 1 from being reduced too much when a sudden load occurs in HST circuit 10 according to the travel state of forward travel, backward travel, or neutral. This can suppress delay in the increase of the capacity of variable charge pump 1 caused when a sudden load acts in a state where the capacity of variable charge pump 1 is reduced too much.

The inclination angle signal of work machine 20 outputted from inclination angle sensor 17 is inputted to minimum charge pump capacity setting unit 37. When the inclination angle of work machine 20 detected by inclination angle sensor 17 is more than or equal to a fourth value, minimum charge pump capacity setting unit 37 performs setting such that the minimum capacity of variable charge pump 1 maintains a fifth value which is a predetermined value. This can suppress delay in the replenishment of the oil into HST circuit 10 by variable charge pump 1, even in a case where a sudden load occurs due to overrunning of work machine 20 on a steep slope.

The temperature signal outputted from temperature sensor 13 is inputted to minimum charge pump capacity setting unit 37. When the temperature detected by temperature sensor 13 is more than or equal to a sixth value, minimum charge pump capacity setting unit 37 performs setting such that the capacity of variable charge pump 1 increases when compared with a case where the temperature is less than the sixth value. This can suppress delay in the replenishment of the oil into HST circuit 10 by variable charge pump 1, even in a case where the oil within HST circuit 10 is overheated due to an increase in the temperature detected by temperature sensor 13.

When it is judged that a sudden load acts, or when it is judged that the oil within HST circuit 10 is overheated, charge pump capacity determination unit 34 determines the capacity set by minimum charge pump capacity setting unit 37 as the capacity of variable charge pump 1.

In addition, when it is judged that a sudden load does not act, or when it is judged that the oil within HST circuit 10 is not overheated, charge pump capacity determination unit 34 determines the capacity calculated by charge pump capacity calculation unit 33 as the capacity of variable charge pump 1.

The capacity of the variable charge pump determined by charge pump capacity determination unit 34 is outputted to charge pump capacity command unit 35. Charge pump capacity command unit 35 issues a command to change the angle of variable swash plate 1*a* of variable charge pump 1 to actuator 1*b* based on the capacity of the variable charge pump determined by charge pump capacity determination unit 34. Thereby, the angle of variable swash plate 1*a* of variable charge pump 1 is changed, and the capacity of variable charge pump 1 is controlled.

As described above, controller 6 controls the capacity of variable charge pump 1 based on the pressure of the oil within HST circuit 10 detected by pressure sensors 11*a* and 11*b*. Controller 6 controls the capacity of variable charge pump 1 to be continuously changed steplessly based on the pressure of the oil within HST circuit 10 detected by pressure sensors 11*a* and 11*b*.

In addition, when the pressure of the oil within HST circuit 10 detected by pressure sensors 11*a* and 11*b* is a first pressure, controller 6 sets the capacity of variable charge pump 1 to a first capacity. In addition, when the pressure of the oil within HST circuit 10 detected by pressure sensors 11*a* and 11*b* is a second pressure smaller than the first pressure, controller 6 sets the capacity of variable charge pump 1 to a second capacity smaller than the first capacity. That is, controller 6 controls variable charge pump 1 to increase the amount of the oil to be supplied (replenished) to HST circuit 10 by variable charge pump 1 as the pressure of the oil within HST circuit 10 increases.

In addition, controller 6 controls the capacity of variable charge pump 1 based on the number of rotations of engine 4 detected by rotation sensor 14 and the pressure of the oil within HST circuit 10 detected by pressure sensors 11*a* and 11*b*.

In addition, controller 6 sets the minimum capacity of variable charge pump 1 based on the towing force of work machine 20. Controller 6 sets the minimum capacity of variable charge pump 1 based on the inclination angle of work machine 20 detected by inclination angle sensor 17. Controller 6 sets the minimum capacity of variable charge pump 1 based on the state selected by travel lever 16. Controller 6 sets the minimum capacity of variable charge pump 1 based on the pilot pressure detected by pilot pressure sensor 12.

<Control Method for Work Machine>

Next, a control method for work machine 20 in the present embodiment will be described with reference to FIGS. 3 and 5.

FIG. 5 is a flowchart showing a control method for the work machine of FIG. 1.

As shown in FIGS. 3 and 5, first, a hydraulic pressure within HST circuit 10 is detected by pressure sensors 11*a* and 11*b* (step S1: FIG. 5). Leak amount estimation unit 31 of controller 6 estimates a leak amount of the oil from HST circuit 10 based on the hydraulic pressure within HST circuit 10 detected by pressure sensors 11*a* and 11*b* (step S2: FIG. 5). Specifically, as described above, leak amount estimation unit 31 refers to the HST pressure-leak amount table stored in storage unit 38, and estimates the leak amount based on the pressure signals received from pressure sensors 11*a* and 11*b*.

Supply amount calculation unit 32 of controller 6 calculates an amount of the oil to be supplied (replenished) to HST circuit 10 based on the leak amount of the oil from HST circuit 10 estimated by leak amount estimation unit 31 (step S3: FIG. 5). Specifically, as described above, supply amount calculation unit 32 calculates the supply amount by multiplying the leak amount estimated by leak amount estimation unit 31 by the safety factor stored in storage unit 38 (supply amount=leak amount×safety factor).

The number of rotations of engine 4 is detected by rotation sensor 14 (step S9: FIG. 5). Charge pump efficiency calculation unit 36 of controller 6 calculates charge pump efficiency of variable charge pump 1 based on the number of rotations of engine 4 detected by rotation sensor 14 (step S10: FIG. 5). Specifically, as described above, charge pump efficiency calculation unit 36 refers to the number of rotations-volume efficiency table in storage unit 38, and calculates volume efficiency of variable charge pump 1 based on the information of the number of rotations of the engine received from rotation sensor 14.

Charge pump capacity calculation unit 33 of controller 6 calculates a capacity of variable charge pump 1 based on the supply amount calculated by supply amount calculation unit 32 and the number of rotations of engine 4 detected by rotation sensor 14 (step S4: FIG. 5). Specifically, as described above, charge pump capacity calculation unit 33 calculates the capacity of variable charge pump 1 by dividing the supply amount received from supply amount calculation unit 32 by the number of rotations of the engine received from rotation sensor 14 (capacity of variable charge pump 1=supply amount÷number of rotations of engine).

When calculating the capacity of variable charge pump 1, charge pump capacity calculation unit 33 of controller 6 calculates the capacity of variable charge pump 1 in consideration of the charge pump efficiency calculated by charge pump efficiency calculation unit 36. Specifically, as described above, charge pump capacity calculation unit 33 calculates the capacity of variable charge pump 1 by dividing the capacity of variable charge pump 1 (=supply amount÷number of rotations of engine) obtained by the above calculation by the volumetric efficiency (capacity equal to theoretical discharge amount=supply amount÷number of rotations of engine÷volume efficiency).

Then, it is judged whether or not a sudden load acts on HST circuit 10 (step S5: FIG. 5). When it is judged that a sudden load acts, a set minimum capacity of variable charge pump 1 is selected (step S6: FIG. 5).

Specifically, the minimum capacity of variable charge pump 1 is set based on a towing force calculated based on the hydraulic pressure within HST circuit 10 detected by pressure sensors 11*a* and 11*b*. When the towing force is smaller than the first value, minimum charge pump capacity setting unit 37 performs setting such that the minimum capacity of variable charge pump 1 has a predetermined value.

In addition, when a pilot pressure detected by pilot pressure sensor 12 is smaller than the third value, minimum charge pump capacity setting unit 37 performs setting such that the minimum capacity of variable charge pump 1 increases when compared with a case where the pilot pressure is more than or equal to the third value. For example, when the pilot pressure is smaller than the third value, minimum charge pump capacity setting unit 37 performs setting such that the capacity of variable charge pump 1 has a maximum value.

In addition, minimum charge pump capacity setting unit 37 sets a minimum capacity of variable charge pump 1 for each case of forward travel, backward travel, and neutral selected by travel lever 16.

In addition, when an inclination angle of work machine 20 detected by inclination angle sensor 17 is more than or equal to the fourth value, minimum charge pump capacity setting unit 37 performs setting such that the minimum capacity of variable charge pump 1 maintains the fifth value which is a predetermined value.

In addition, instead of judging whether or not a sudden load acts (step S5: FIG. 5), it may be judged whether or not the oil within HST circuit 10 is overheated. When it is judged that the oil is overheated, a set capacity of variable charge pump 1 is selected (step S6: FIG. 5).

Specifically, when a temperature detected by temperature sensor 13 is more than or equal to the sixth value, minimum charge pump capacity setting unit 37 performs setting such that the capacity of variable charge pump 1 increases when compared with a case where the temperature is less than the sixth value.

When it is judged that a sudden load acts, or when it is judged that the oil within HST circuit 10 is overheated, the set minimum capacity described above is determined as the capacity of the variable charge pump (step S7: FIG. 5).

In addition, when it is judged that a sudden load does not act, or when it is judged that the oil within HST circuit 10 is not overheated, the capacity calculated by charge pump capacity calculation unit 33 is determined as the capacity of the variable charge pump (step S7: FIG. 5).

based on the determined capacity of variable charge pump 1, the capacity of variable charge pump 1 is controlled (step S8: FIG. 5).

<Effect>

According to the present embodiment, as shown in FIG. 3, controller 6 controls the capacity of variable charge pump 1 based on the pressure of the oil within HST circuit 10 detected by pressure sensors 11a and 11b. Thereby, the oil can be appropriately replenished by variable charge pump 1 according to the leak amount from HST circuit 10. Thus, loss of horsepower is reduced, and fuel economy can be improved.

In the embodiment described above, controller 6 controls the capacity of variable charge pump 1 to be changed steplessly based on the pressure of the oil within HST circuit 10 detected by pressure sensors 11a and 11b. Thereby, the oil can be appropriately replenished by variable charge pump 1 according to the leak amount from HST circuit 10. Thus, loss of horsepower is reduced, and fuel economy can be improved.

In the embodiment described above, controller 6 controls the capacity of variable charge pump 1 to be set to the first capacity when the pressure of the oil within HST circuit 10 detected by pressure sensors 11a and 11b is the first pressure, and controls the capacity of variable charge pump 1 to be set to the second capacity smaller than the first capacity when the pressure of the oil within HST circuit 10 detected by pressure sensors 11a and 11b is the second pressure smaller than the first pressure. The leak amount of the oil from HST circuit 10 increases as the pressure of the oil within HST circuit 10 increases. Thus, by increasing the amount of the oil to be supplied (replenished) to HST circuit 10 by variable charge pump 1 as the pressure of the oil within HST circuit 10 increases, the oil can be appropriately replenished into HST circuit 10. Hence, loss of horsepower is reduced, and fuel economy can be improved.

In the embodiment described above, as shown in FIG. 2, controller 6 controls the capacity of variable charge pump 1 based on the number of rotations of engine 4 detected by rotation sensor 14 and the pressure of the oil within HST circuit 10 detected by pressure sensors 11a and 11b. The amount of the oil to be supplied (replenished) to HST circuit 10 can be calculated based on the number of rotations of engine 4 and the pressure of the oil within HST circuit 10. Thus, the oil can be appropriately replenished into HST circuit 10.

In the embodiment described above, as shown in FIG. 3, controller 6 sets the minimum capacity of variable charge pump 1 based on the towing force of work machine 20. Specifically, the towing force of work machine 20 can be calculated based on the pressure of the oil within HST circuit 10 detected by pressure sensors 11a and 11b, and the minimum capacity of variable charge pump 1 is set based on the towing force. This prevents the capacity of variable charge pump 1 from being reduced too much when work machine 20 is overrunning on a downward slope, for example. This can suppress delay in the increase of the capacity of variable charge pump 1 caused when a sudden load acts in a state where the capacity of variable charge pump 1 is reduced too much.

In the embodiment described above, as shown in FIG. 2, pressure sensors 11a and 11b include first pressure sensor 11a that detects the first pressure of the oil in first flow path 10a of HST circuit 10, and second pressure sensor 11b that detects the second pressure of the oil in second flow path 10b of HST circuit 10. Thereby, the pressure of the oil within HST circuit 10 can be measured in any of forward travel and backward travel.

In the embodiment described above, as shown in FIG. 3, controller 6 sets the minimum capacity of variable charge pump 1 based on the inclination angle of work machine 20 detected by inclination angle sensor 17. It can be detected from the inclination angle of work machine 20 that work machine 20 is overrunning on a downward slope.

In the embodiment described above, as shown in FIG. 3, controller 6 sets the minimum capacity of variable charge pump 1 based on the state selected by travel lever 16. This prevents the capacity of variable charge pump 1 from being reduced too much when a sudden load occurs in HST circuit 10 according to the travel state of forward travel, backward travel, or neutral. This can suppress delay in the increase of the capacity of variable charge pump 1 caused when a sudden load acts in a state where the capacity of variable charge pump 1 is reduced too much.

In the embodiment described above, as shown in FIG. 2, variable charge pump 1 is connected to provide the pilot pressure to the drive circuits for the actuators (tilt cylinder 25, lift cylinder 26) of work implement 22. Thereby, individual pumps for providing the pilot pressure to the drive circuits for actuators 25 and 26 can be omitted, and the configuration can be simplified.

In the embodiment described above, as shown in FIG. 3, controller 6 sets the minimum capacity of variable charge pump 1 based on the pilot pressure detected by pilot pressure sensor 12. This prevents the capacity of variable charge pump 1 from being reduced too much when a sudden load occurs in HST circuit 10, and can compensate for the minimum value of the pilot pressure.

It should be noted that, although the present embodiment has described a case where oil is used as a fluid within HST circuit 10, the fluid within HST circuit 10 may be a fluid other than oil. In addition, although the present embodiment has described engine 4 as a motive power source, a motive power source other than engine 4 may be adopted as long as it can provide a drive force. In addition, in the present embodiment, each of hydraulic pump 2 and hydraulic motor 3 shown in FIG. 2 may be of a fixed capacity type.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: variable charge pump; 1a, 2a, 3a: variable swash plate; 1b, 2b, 3b: actuator; 2: hydraulic pump; 3: hydraulic motor;

4: engine; 5a: output shaft; 5b: input shaft; 6: controller; 7: oil cooler; 8: filter; 9a, 9b: valve; 9c: relief valve; 10: HST circuit; 10a: first oil path; 10b: second oil path; 11a: first pressure sensor; 11b: second pressure sensor; 12: pilot pressure sensor; 13: temperature sensor; 14: rotation sensor; 16: travel lever; 17: inclination angle sensor; 18: tank; 20: work machine; 21: vehicular body; 22: work implement; 22a: blade; 22U: upper end; 23: crawler travel unit; 23a: drive wheel; 23b: idler wheel; 23c: crawler belt; 23d: track frame; 24: frame; 25: tilt cylinder; 26: lift cylinder; 28: cab; 29: engine compartment; 31: leak amount estimation unit; 32: supply amount calculation unit; 33: charge pump capacity calculation unit; 34: charge pump capacity determination unit; 35: charge pump capacity command unit; 36: charge pump efficiency calculation unit; 37: minimum charge pump capacity setting unit; 38: storage unit; 41: directional control valve; 100: excavation object; HD: hydraulic drive unit.

The invention claimed is:

1. A work machine comprising:
a motive power source;
a closed circuit having a pump that converts a drive force of the motive power source into energy of a fluid and a motor that converts the energy of the fluid converted by the pump into drive energy;
a pressure sensor that detects a pressure of the fluid within the closed circuit;
a variable charge pump that replenishes the fluid into the closed circuit; and
a controller that controls a capacity of the variable charge pump based on the pressure of the fluid within the closed circuit detected by the pressure sensor, wherein the controller controls the capacity of the variable charge pump to be set to a first capacity when the pressure of the fluid detected by the pressure sensor is a first pressure, and controls the capacity of the variable charge pump to be set to a second capacity smaller than the first capacity when the pressure of the fluid detected by the pressure sensor is a second pressure smaller than the first pressure.

2. The work machine according to claim 1, wherein the controller controls the capacity of the variable charge pump to be changed steplessly based on the pressure of the fluid detected by the pressure sensor.

3. The work machine according to claim 1, further comprising a rotation sensor that detects a number of rotations of the motive power source, wherein
the controller controls the capacity of the variable charge pump based on the number of rotations of the motive power source detected by the rotation sensor and the pressure of the fluid detected by the pressure sensor.

4. The work machine according to claim 1, wherein the controller sets a minimum capacity of the variable charge pump based on a towing force of the work machine.

5. The work machine according to claim 4, wherein
the closed circuit has a first flow path that connects the pump and the motor, and a second flow path that connects the pump and the motor and is different from the first flow path, and
the pressure sensor includes a first pressure sensor that detects a pressure of the fluid in the first flow path, and a second pressure sensor that detects a pressure of the fluid in the second flow path.

6. The work machine according to claim 1, further comprising an inclination angle sensor that detects an inclination angle of the work machine, wherein
the controller sets a minimum capacity of the variable charge pump based on the inclination angle of the work machine detected by the inclination angle sensor.

7. The work machine according to claim 1, further comprising a travel lever that selects one state of forward travel, backward travel, and neutral in traveling of the work machine, wherein
the controller sets a minimum capacity of the variable charge pump based on the state selected by the travel lever.

8. The work machine according to claim 1, further comprising
a work tool; and
an actuator that drives the work tool, wherein
the variable charge pump is connected to provide a pilot pressure to a drive circuit for the actuator.

9. The work machine according to claim 8, further comprising a pilot pressure sensor that detects the pilot pressure, wherein
the controller sets a minimum capacity of the variable charge pump based on the pilot pressure detected by the pilot pressure sensor.

10. A control method for a work machine, the work machine having a motive power source, and a closed circuit having a pump that converts a drive force of the motive power source into energy of a fluid and a motor that converts the energy of the fluid converted by the pump into drive energy, the control method comprising:
detecting a pressure of the fluid within the closed circuit; and
controlling a capacity of a variable charge pump that replenishes the fluid into the closed circuit, based on the detected pressure of the fluid within the closed circuit, wherein, in controlling the capacity of the variable charge pump, the capacity of the variable charge pump is controlled to be set to a first capacity when the detected pressure of the fluid is a first pressure, and the capacity of the variable charge pump is controlled to be set to a second capacity smaller than the first capacity when the detected pressure of the fluid is a second pressure smaller than the first pressure.

11. The control method for the work machine according to claim 10, wherein, in controlling the capacity of the variable charge pump, the capacity of the variable charge pump is controlled to be changed steplessly based on the detected pressure of the fluid.

12. The control method for the work machine according to claim 10, further comprising detecting a number of rotations of the motive power source, wherein
in controlling the capacity of the variable charge pump, the capacity of the variable charge pump is controlled based on the detected number of rotations of the motive power source and the detected pressure of the fluid.

13. The control method for the work machine according to claim 10, further comprising detecting a towing force of the work machine, wherein
in controlling the capacity of the variable charge pump, a minimum capacity of the variable charge pump is set based on the detected towing force of the work machine.

14. The control method for the work machine according to claim 13, wherein
the closed circuit has a first flow path that connects the pump and the motor, and a second flow path that connects the pump and the motor and is different from the first flow path, and detecting the pressure of the fluid within the closed circuit includes detecting at least one of a pressure of the fluid in the first flow path and a pressure of the fluid in the second flow path.

15. The control method for the work machine according to claim 10, further comprising detecting an inclination angle of the work machine, wherein in controlling the capacity of the variable charge pump, a minimum capacity of the variable charge pump is set based on the detected inclination angle of the work machine.

16. The control method for the work machine according to claim 10, further comprising detecting one travel state of forward travel, backward travel, and neutral in traveling of the work machine, wherein in controlling the capacity of the variable charge pump, a minimum capacity of the variable charge pump is set based on the detected travel state.

17. The control method for the work machine according to claim 10, wherein the work machine further has a work tool, and an actuator that drives the work tool, the variable charge pump is connected to provide a pilot pressure to a drive circuit for the actuator, the control method further comprises detecting the pilot pressure, and in controlling the capacity of the variable charge pump, a minimum capacity of the variable charge pump is set based on the detected pilot pressure.

* * * * *